Figure 1:
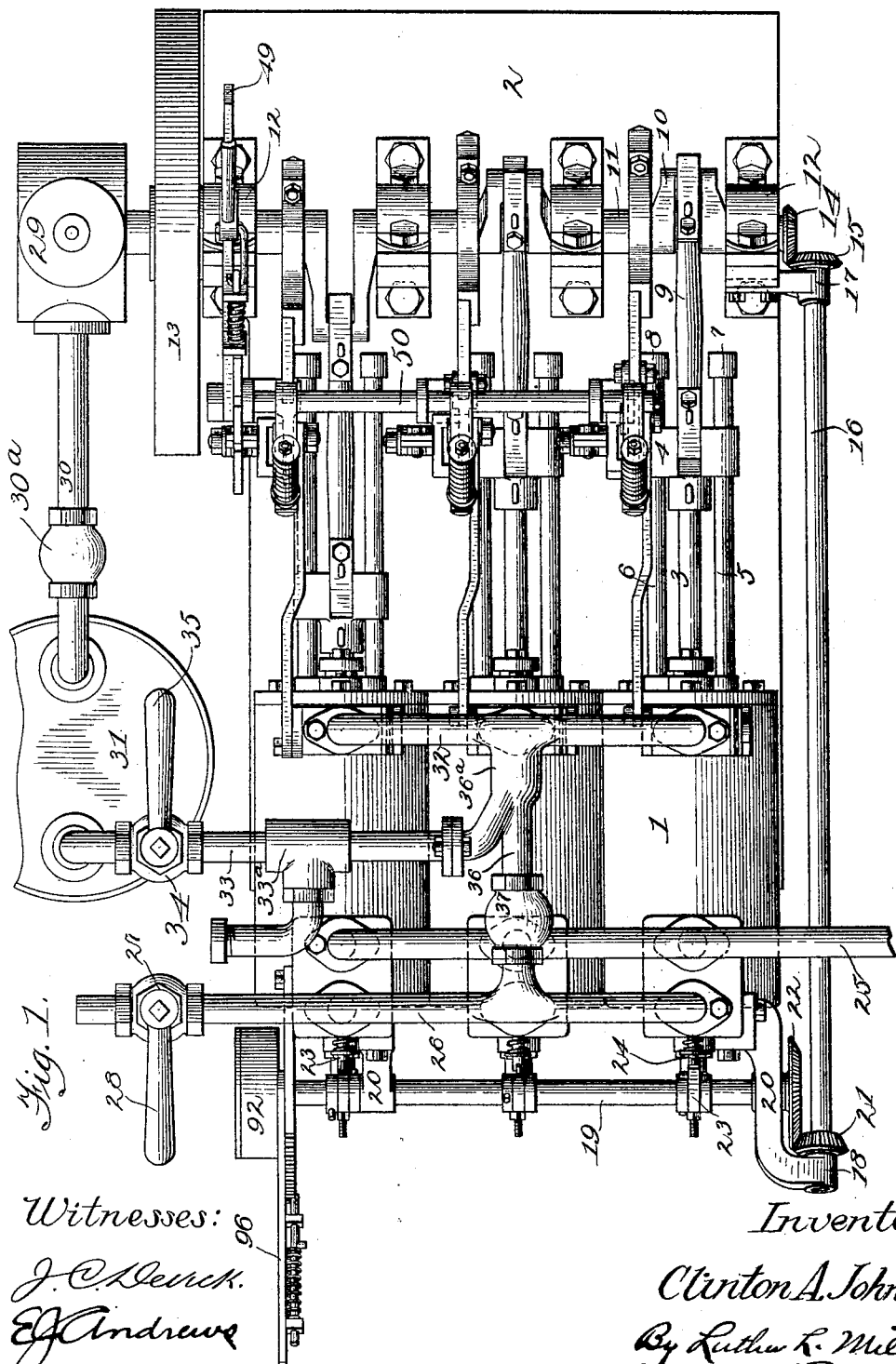

C. A. JOHNSON.
PRIME MOVER.
APPLICATION FILED APR. 10, 1912.

1,118,017.

Patented Nov. 24, 1914.
4 SHEETS—SHEET 1.

Witnesses:
J. C. Derick.
E. J. Andrews

Inventor:
Clinton A. Johnson
By Luther L. Miller
Atty.

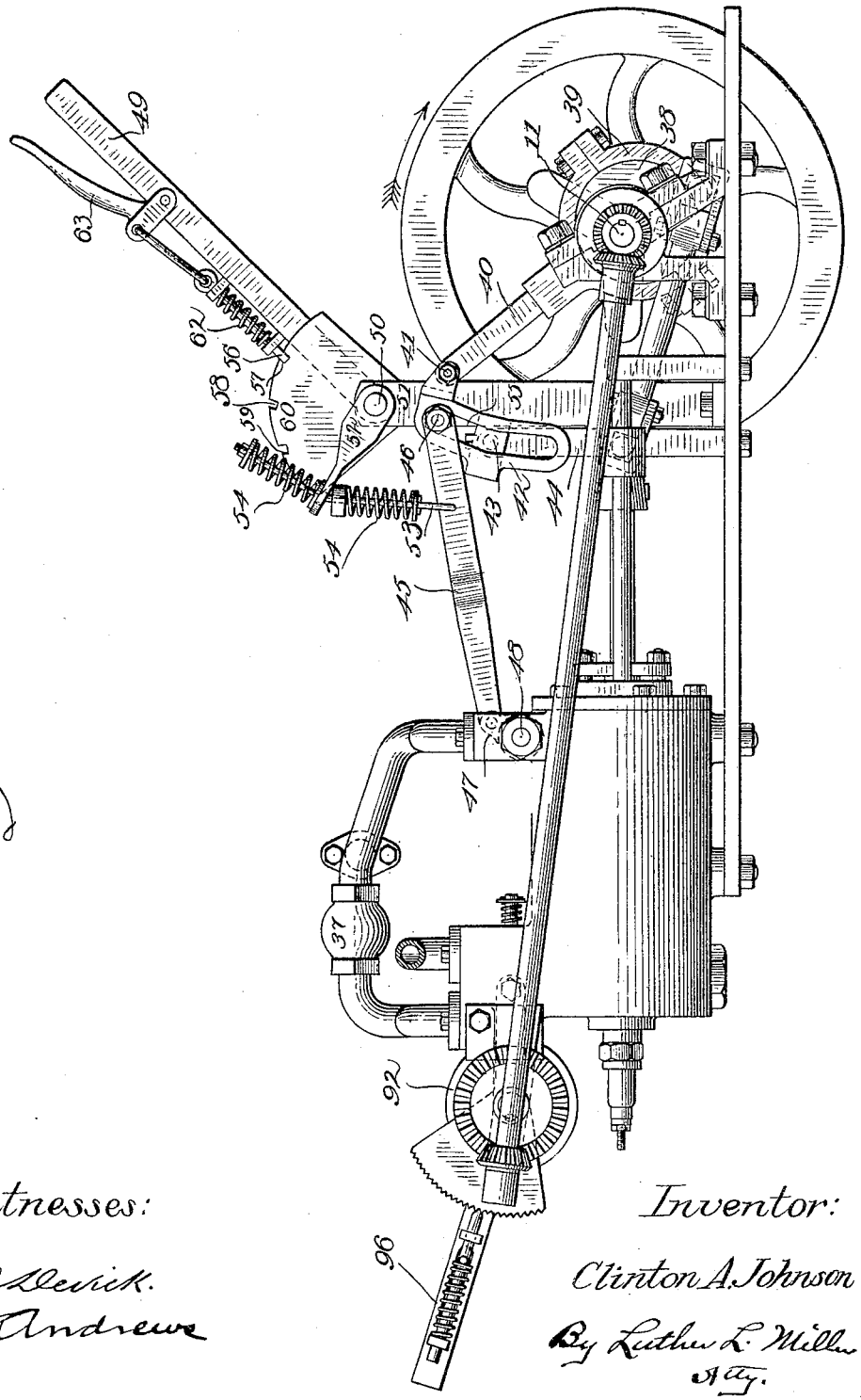

C. A. JOHNSON.
PRIME MOVER.
APPLICATION FILED APR. 10, 1912.
1,118,017.
Patented Nov. 24, 1914.
4 SHEETS—SHEET 3.
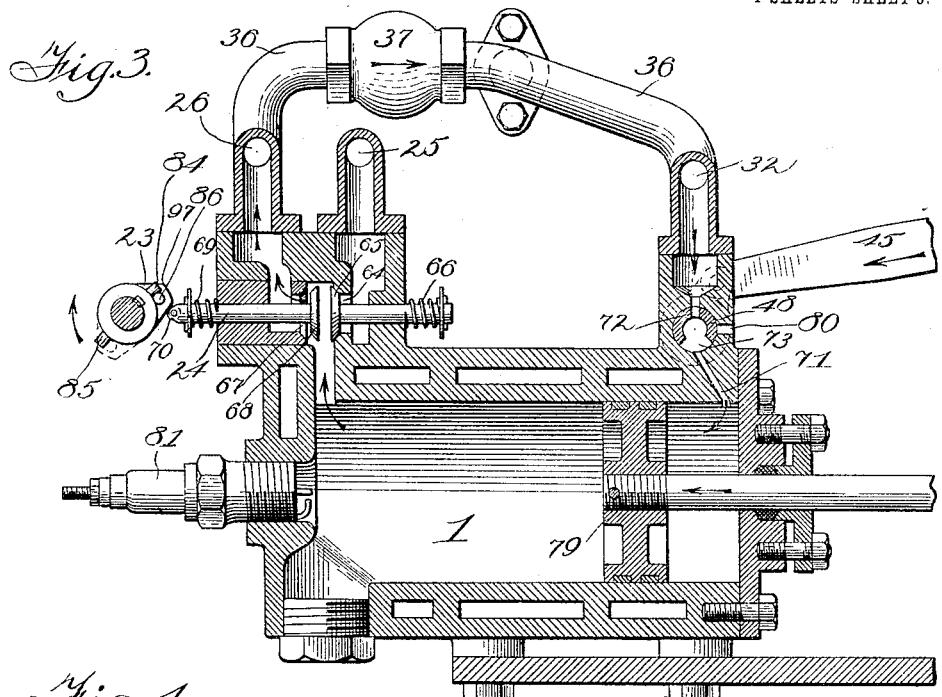
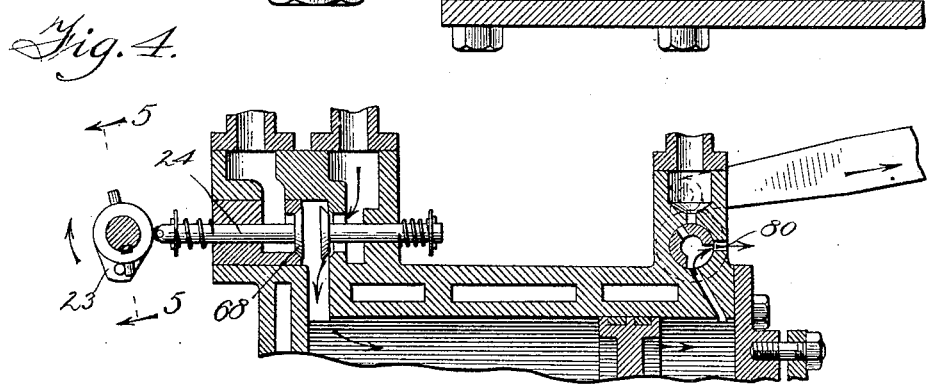
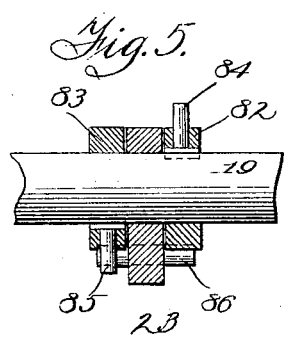
Witnesses:
J. C. Devick.
E. J. Andrews
Inventor:
Clinton A. Johnson
By Luther L. Miller
Atty.

C. A. JOHNSON.
PRIME MOVER.
APPLICATION FILED APR. 10, 1912.
1,118,017.
Patented Nov. 24, 1914.
4 SHEETS—SHEET 4.
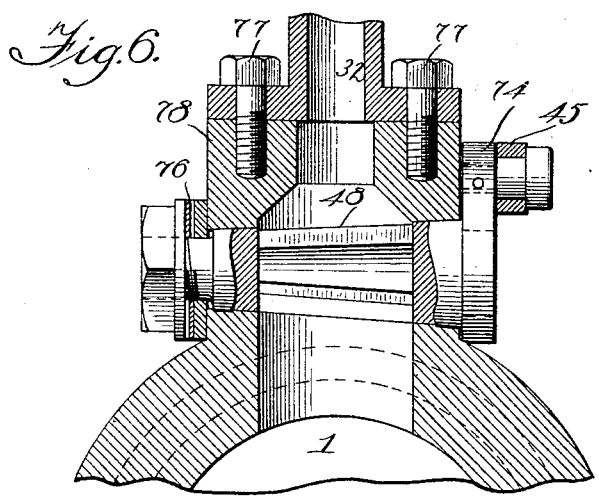
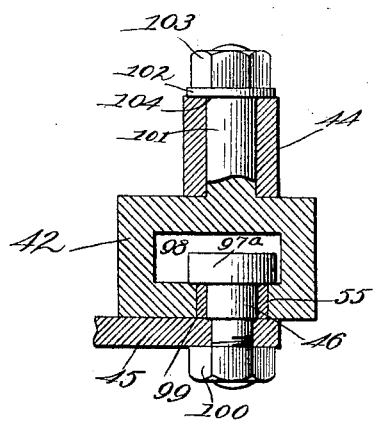
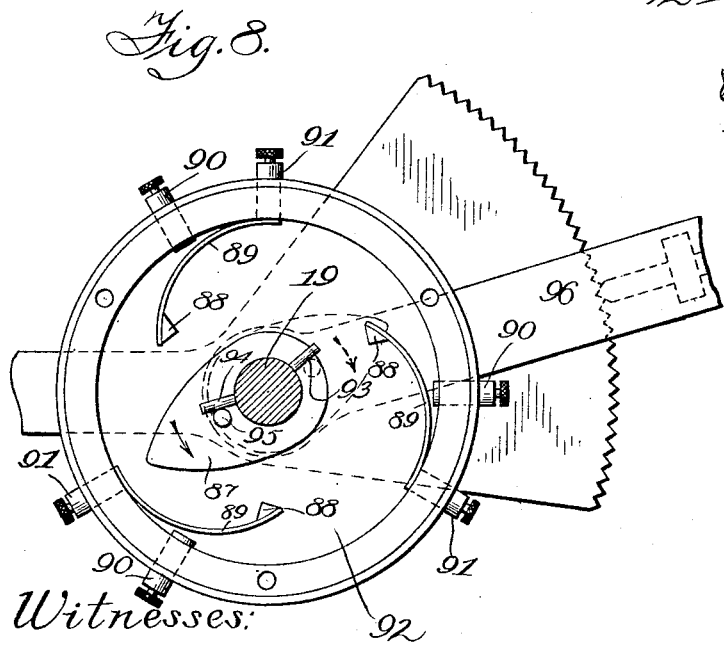
Witnesses:
J. C. Devitt.
E. J. Andrews
Inventor:
Clinton A. Johnson
By Luther L. Miller
Atty.

UNITED STATES PATENT OFFICE.

CLINTON A. JOHNSON, OF CHICAGO, ILLINOIS, ASSIGNOR OF ONE-FIFTH TO OLE C. OLSEN, TWELVE ONE-HUNDREDTHS TO RALPH H. BURDICK, THREE AND ONE-HALF ONE-HUNDREDTHS TO BENJIMAN H. HILL, THREE AND ONE-HALF ONE-HUNDREDTHS TO CLARENCE COLE, THREE AND ONE-HALF ONE-HUNDREDTHS TO ALBERT L. WAYNE, ONE AND ONE-HALF ONE-HUNDREDTHS TO FRANK B. McFALL, AND ONE-TWENTIETH TO LON H. BEALL, ALL OF CHICAGO, ILLINOIS.

PRIME MOVER.

1,118,017.   Specification of Letters Patent.   Patented Nov. 24, 1914.

Application filed April 10, 1912. Serial No. 689,720.

*To all whom it may concern:*

Be it known that I, CLINTON A. JOHNSON, a citizen of the United States, residing at Chicago, in the county of Cook and State of Illinois, have invented certain new and useful Improvements in Prime Movers, of which the following is a specification.

This apparatus relates to an engine which may be used as an internal combustion engine alone or as such an engine in combination with gas under pressure, such as air or steam.

The objects of the invention are: First, to produce a prime mover which has a high efficiency because of the compounding of its gas under pressure without the complications of two cylinders, as ordinarily used for that purpose. Second, to produce an internal combustion engine which is self-starting. Third, to produce an internal combustion engine which may be used in combination with other gases under pressure, thereby increasing the efficiency of the engine. Fourth, to produce a prime mover which may be run as an internal combustion engine alone, or by steam or other gas under pressure alone. Fifth, to produce an engine that may be quickly and conveniently reversed. Sixth, to introduce into a prime mover various improvements which will appear from the specification following.

In the accompanying drawings, Figure 1 is a plan view of an embodiment of my invention consisting of a triple-cylinder engine. Fig. 2 is a side elevation of the engine. Fig. 3 is a vertical longitudinal section of one of the cylinders of the engine. Fig. 4 is a similar section of a portion of the cylinder, with the piston and valves differently arranged. Fig. 5 is a section of the cam actuating one of the cylinder valves, taken along the line 5 5 of Fig. 4. Fig. 6 is a section, transversely to the cylinder, of one of the valves. Fig. 7 is a transverse section of the reversing link of the engine at its neutral position. Fig. 8 is a diagrammatic view of the timer and its governor.

Referring now to Fig. 1, and particularly to one of the engines, the cylinder 1 is mounted on the base 2 and it has a piston rod 3 attached to the cross-head 4 sliding on the guides 5 and 6 supported by the standards 7 and 8. The connecting rod 9 is pivoted to the crank 10 of the driving shaft 11 which is mounted in the bearings 12. 13 indicates the fly wheel.

14 indicates a bevel gear mounted on the shaft 11 and meshing with the bevel gear 15 mounted on the shaft 16 which is supported by the bearings 17 and 18.

The cam shaft 19, turning in the bearings 20, is operated by the shaft 16 by means of the bevel gears 21 and 22. Mounted on the shaft 19 is the cam 23 (Figs. 3 and 4) which actuates the valve rod 24. The pipe 25 connects the carbureter (not shown) to each of the cylinders. The exhaust valves of the cylinders are connected with the pipe 26 which has a valve 27 conveniently closed by the handle 28.

29 indicates an air pump direct-connected to the shaft 11 or otherwise suitably driven, which pump forces air through the pipe 30 through the check valve 30ª and into the tank 31, and from here the air may pass into the cylinder-supply pipe 32 by a pipe 33 provided with a valve 34 which may be closed by the handle 35. The pipe 36 connects the exhaust pipe 26 with the cylinder-supply pipe 32 and has a check valve 37 between the two pipes. The air pipe 33 joins the pipe 36 at an acute angle between the valve 37 and the pipe 32.

33ª indicates a fitting for connection with a steam boiler, if desired.

Fig. 2 shows the eccentric 38 on the main shaft 11 with a strap 39 and an eccentric connecting rod 40 pivoted at 41 to the reversing link 42 which is pivoted at its neutral point 43 to the standard 44. The connecting link 45 pivoted to the reversing link at 46 is pivoted at its other end to the crank 47 which actuates the valve 48 (Fig. 3). A lever 49 is non-rotatably attached to the shaft 50, which is supported by the standards 51. Non-rotatably connected to the shaft 50 is the arm 52 (Fig. 2) attached to the connecting link 45 by means of the rod 53 and the buffer springs 54.

The shaft 50 may be rocked by means of the lever 49, and the position of the lever determines the position of the pivot 46 in the reversing link. When the pivot is in the upper end of the slot 55 of said link the direction of rotation of the fly wheel, as viewed in Fig. 2, is clockwise. When the pivot is at the lower end of the slot the direction of rotation is counterclockwise, and when at the center or neutral position the action of the valve ceases; the action of the engine then will be described hereafter.

The lever 49 is held in place by the detent 56 which may be made to enter the notches 57, 58 and 59 of a sectoral plate 60 attached to one of the standards 51. The detent may be held in the notches in any suitable manner, such as by the spring 62, or may be removed therefrom by the lever 63, or any other suitable device.

Fig. 3 shows the inlet port 64 at the internal combustion end of the cylinder. This port is controlled by the valve 65, which may be normally closed by a weak spring 66, or by any other suitable means. The outlook port 67 is controlled by the valve 68 which may be closed by the spring 69 and opened by the cam 23 playing on the roller 70 in the end of the valve rod 24. At the air or steam end of the cylinder is the inlet and outlet port 71 controlled by the valve 48 which has a small port 72 and a large port 73, for purposes hereafter to be shown. This valve 48, as shown in Fig. 6, may have at one end a crank 74 pivoted to the connecting link 45, and at the other end a spring washer 76; and it controls the passage of gas through the pipe 32 which may be fastened by means of bolts 77 to the valve casing 78 of the cylinder 1.

When it is desired to start the engine and operate it clockwise as an internal combustion engine, the pivot 46 is thrown to the upper end of the slot 55, and the valves 27 and 34 may be opened. Air under pressure passes into the pipe 32, and in one of the three cylinders it will find the valves 48 and 68 and the piston 79 in approximately the positions indicated in Fig. 3, as the valve cams 23 the eccentrics 38 and the pistons 79 are respectively connected on the shafts 19 and 11 at 120° from each other. The air will press the piston to the left, the gas in the piston end of the cylinder being driven out through the port 67 into the exhaust pipe 26. As the fly wheel carries on the rotation of the driving shaft, the piston will be reversed and at the same time the valve 48 will be rotated to approximately the position shown in Fig. 4, so that the air in the right-hand end of the cylinder will pass out through the port 80; while the fuel will be drawn from the carbureter through the supply pipe 25 and the port 64 into the combustion end of the cylinder. When the piston reaches the right-hand end of the cylinder, the valve 48 is again rotated into the position shown in Fig. 3; compressed air passes into the right-hand end of the cylinder, again forces the piston to the left; the fuel in the combustion chamber is then compressed, and, at the proper time, the spark passes across the terminals of the spark plug 81, an explosion may occur, and the piston will be driven back. If, however, the explosion fails, the process will be repeated until the spark becomes effective. Meanwhile a similar cycle of operations will be commencing in each of the other cylinders. As soon as the explosions occur the valve 34 may be closed and the engine then will run continuously as an internal combustion engine, using only the left-hand end of the cylinder. To produce this result, however, is is desirable to throw the detent of the lever 49 into the notch 58 so as to move the reversing link pin 46 into the neutral position, and thus maintain the valve 48 approximately in the position shown in Fig. 4 so that the right-hand end of the cylinder will be continually open to the atmosphere.

The cycles of the internal combustion engine, in each of the cylinders, are carried out in the following manner: As the piston passes to the left with the valves as shown in Fig. 3, the gas in the left-hand end of the cylinder passes out through the valve port 67, and the exhaust pipe 26. As the piston returns to the right, fuel is pushed in through the valve port 64 because of the reduced pressure in the cylinder. As the piston returns to the left, the valve 67 remains closed, because the cam shaft 19 rotates but once to two rotations of the driving shaft. Hence the fuel is compressed, and at the proper time the fuel is exploded by the spark of the spark plug, the piston is driven back to the right, and the cycle is complete.

If it is desired to run the engine as a combined internal combustion and gas pressure engine, the pivot 46 of the reversing link may be thrown toward one end or the other of the slot 55; if clockwise rotation is desired it is thrown to the upper end. Steam or air under pressure is then allowed to enter through the valve 48, and as the check valve 37 prevents the passage of steam into the combustion end of the cylinder, the two ends of the cylinder act independently, one as an internal combustion cylinder and the other as an ordinary steam or air pressure cylinder, the valve 27 being open. If desired, however, valve 27 may be closed and the exhaust will then pass with the steam or compressed air into the right-hand ends of the cylinders. In such a case, during a portion of the time the inrushing air will cause a partial vacuum at the junction of the pipes 33 and 36, due to the enlarged portion 36ª, and the exhaust will then have less back pressure to overcome.

If it is desired to use the engine as an internal combustion engine alone and to most efficiently dispose of the gas exploded in the combustion end of the cylinders, the valves 27 and 34 are closed as soon as the engine is started, and the process is as follows: An explosion occurs and drives the piston to the right. The valves 67 then opens and the valve 48 rotates to the position shown in Fig. 3, and as the piston passes to the left, the burnt gases partly expanded pass through the connected valves and pipes to the right-hand end of the cylinder, pressing against the right-hand side of the piston. As the piston again moves to the right, the valve 48 opens the connection of the right-hand end of the piston with the atmosphere, the exhausted gas passes out, and at the same time another supply of fuel enters through the valve 65. The piston passes again to the left, an explosion occurs, and the process is then repeated. The burnt or exhaust gases thus entering the right-hand end of the cylinder, being under greater than atmospheric pressure, enter more readily than the outside air would, and at the same time the exhaust is thus disposed of temporarily with less back pressure than if it were forced out into the atmosphere. In the meantime, the exhaust cools and contracts, and finally is expelled from the right-hand end of the cylinder with less back pressure than if it were expelled when hotter. Meanwhile, the other cylinders are passing through various similar cyclic stages, and during a portion of the time, as the cylinders are all connected by the pipes 26, 36 and 32, there will be two right-hand cylinder ends open to receive the exhaust from one left-hand cylinder end; because the cylinders will all receive at the right-hand ends during one-half of the time, but will exhaust from the left-hand ends during only one-fourth of the time.

If it is desired to reverse the direction of rotation, the reversing link pivot is thrown to the lower end of the slot, and the valves 48 will then be reversed with reference to the position and direction of motion of the pistons and will be operated at the proper times to produce rotation in the opposite direction. At the same time the cams 23 will be automatically reversed. Fig. 5 shows the details of these cams. The collars 82 and 83 are attached rigidly to the shaft 19 by any suitable means. Inserted in these collars are cam-driving pins 84 and 85 approximately diametrically opposite to each other. The cam 23 rotates freely upon the shaft within the limits allowed by the pin 86 which extends from both sides of the cam and strikes, in the rotation of the cam, the pin 84 or 85.

In the clockwise rotation of the engine the cam is driven by the pin 84 in the direction indicated by the arrow in Fig. 3. When the engine runs in the reverse direction the cam shaft rotates in the opposite direction and the cam is pushed backwardly by the valve pin into contact with the pin 85. The valve is thus opened in either case at the proper time to allow the burnt gas to pass from the combustion chamber. The timer 92 is also automatically reversed in a somewhat similar manner. As shown in Fig. 8 the timer contacts are made by a cam 87 striking on the projections 88 on the spring arms 89 and forcing the arms into contact with binding posts 90, thus connecting the binding posts 90 and 91, closing the circuit through the induction coil and causing sparks in the combustion chamber at the proper time. The cam 87 rotates freely on the shaft 19 within the limits allowed by the driving pins 93 and 94 set in said shaft, and the pin 95 set in the cam.

When the direction of rotation of the engine is clockwise the direction of the timer cam shaft 19, when viewed from the timer end of the shaft, is as indicated by the full-line arrow, and the cam is moved by the projections 88 until the cam pin 95 strikes against the shaft pin 94. When the direction of rotation of the engine is reversed, the direction of the timer cam shaft is reversed as indicated by the dotted arrow, and the cam is rotated by the projections 88 until the cam pin strikes the shaft pin 93, as indicated by the dotted lines. The time of the spark with reference to the position of the piston may be thus made to approximate the proper time for either direction of rotation of the engine; and the time may be further regulated by the timer controller 96 in the ordinary manner.

One feature of importance in my invention is the method of closing the exhaust valve 68. Considering Fig. 3, as the piston passes to the left the exhaust valve is open as shown, and remains so until the valve stem roller passes to the corner 97 of the cam. The roller then, forced backwardly by the action of the spring on the valve pin, instantly pushes the cam forward and allows the valve to shut. By this arrangement the valve is maintained open until the piston reaches the left-hand end of the cylinder, and is then instantly closed.

The engines, as shown, act as four-cycle engines, the gear wheel 22 being twice the diameter of the gear wheel 21, so that the cam shaft 19 rotates but once while the driving shaft rotates twice; and thus the valve 68 is maintained closed during the entire drawing in and the compression and the expansion strokes of the piston, and opens only at the proper time to release the exhaust.

Another feature of importance is the arrangement of the reversing link and its connections. Fig. 7 shows a transverse section of this link at its neutral point. The pivot 46 has a head 97ª playing in the inner enlarged portion 98 of the slot 55, and passes through a roller 99 playing in the narrow portion of the slot, passing then through the connecting link 45, and thus securing together the connecting link and the reversing link by means of the nut 100.

The reversing link is supported by the standard 44 by means of the stud 101 projecting from the link 42 passing through an opening in the standard 44, and is kept in proper place by means of a washer 102 and nut 103 pressing against the shoulder 104 on the stud. By reason of the narrow port 72 in the valve 48 gas entering the cylinder may be cut off at the proper time, and the gas in the cylinder allowed to expand in the usual manner. And by reason of the wide port 73 in the valve, the external passage may be kept open during the entire exhaust stroke. I do not limit myself, however, to the details of construction herein shown, for various modifications within the scope of the claims will occur to those skilled in the art, and it is particularly desired not to confine the number of cylinders to three, or the angle at which the pistons are connected to the shaft with respect to each other to 120°.

I claim as my invention:

1. In a prime-mover, the combination of a plurality of cylinders, means for supplying fuel to one end of each cylinder, means for igniting the fuel in each cylinder, means for supplying gas under pressure to the opposite end of each cylinder, a conduit connecting the combustion ends of all of the cylinders together, a second conduit connecting the compressed gas ends of all the cylinders together, and a third conduit connecting the two first mentioned conduits with each other.

2. In a prime-mover, the combination of a plurality of cylinders, means for supplying combustible fuel to one end of each cylinder, means for igniting the fuel therein, an exhaust valve in the mentioned end of each cylinder, a pipe connecting all of said exhaust valves together, a controlling valve at the opposite end of each cylinder, a compressed gas tank, a pipe connecting said tank with each of said controlling valves whereby gas under pressure will be supplied to the last mentioned end of each cylinder, and a pipe connecting the two first mentioned pipes with each other.

3. In a prime-mover, in combination, a cylinder, a piston slidable therein, one end of said cylinder being equipped for internal combustion to move said piston in one direction, and the opposite end of said cylinder being arranged to be supplied with gas under pressure to move the piston in the opposite direction, a conduit connecting the ends of said cylinder, and a pipe for supplying gas under pressure to the second mentioned end of said cylinder, said pipe joining said conduit at an acute angle pointing in the direction of the flow of fluid in said pipe.

4. In a prime-mover, in combination, a cylinder, means for supplying combustible fuel to one end of said cylinder, igniting means and an exhaust valve in said end of the cylinder, a controlling valve at the opposite end of the cylinder, an externally arranged pipe connecting said exhaust valve with said controlling valve, and a pipe for supplying gas under pressure, the latter pipe joining the first mentioned pipe at an acute angle pointing toward said controlling valve.

5. In a prime-mover, the combination of a plurality of cylinders, a piston in each cylinder, one end of each cylinder being equipped for operation by internal combustion to move the piston in one direction, and the opposite end of each cylinder being adapted to be supplied with gas under pressure to move the piston in the opposite direction, means maintaining the combustion ends of all the cylinders in communication with each other, and also with the opposite ends of all of the cylinders, and suitably controlled valves for governing the flow of the gases in said means.

6. In a prime-mover, the combination of a plurality of cylinders, a piston in each cylinder, means for supplying combustible fuel to one end of each cylinder, an igniting device and an exhaust valve in the mentioned end of each cylinder, a controlling valve at the opposite end of each cylinder, a tank for compressed gas, a pump operable by said piston for forcing gas into said tank, a conduit connecting said tank with each of said controlling valves, means to maintain communication between all of said controlling valves and all of said exhaust valves, and means for operating each of said valves at the proper time.

7. In a prime-mover, the combination of a plurality of cylinders, a piston in each cylinder, means for supplying combustible fuel to one end of each cylinder, an ignition device and an exhaust valve in the mentioned end of each cylinder, a controlling valve at the opposite end of each cylinder, means to maintain all of said exhaust valves in communication with each other and with all of said controlling valves, and means for supplying gas under pressure to each cylinder through its controlling valve.

8. In a prime-mover, in combination, a cylinder, a piston slidable therein, one end of said cylinder being constructed for operation by internal combustion to move said piston in one direction, and the opposite end of said cylinder being arranged to receive compressed air to move said piston in the opposite direction, a pipe connecting opposite ends of said cylinder, a compressed air tank connected to the last mentioned end of said cylinder, and a pump driven by said piston for forcing air into said tank.

9. In a prime-mover, in combination, a cylinder, a piston slidable therein, means for supplying combustible fuel to one end of said cylinder, an igniting device and an exhaust valve in the mentioned end of said cylinder, a controlling valve at the opposite end of said cylinder, a compressed air tank, a pump operable by said piston for forcing air into said tank, and pipes leading respectively from said exhaust valve and from said tank to said controlling valve.

In testimony whereof I hereunto affix my signature in the presence of two witnesses.

CLINTON A. JOHNSON.

Witnesses:
RALPH H. BURDICK,
OLE C. OLSEN.

Copies of this patent may be obtained for five cents each, by addressing the "Commissioner of Patents, Washington, D. C."